US007107020B2

(12) United States Patent
Chang

(10) Patent No.: US 7,107,020 B2
(45) Date of Patent: Sep. 12, 2006

(54) MOBILE PHONE POSITIONING APPARATUS FOR RADIATION TESTING

(75) Inventor: Chin-Wei Chang, Taipei (TW)

(73) Assignee: Arima Communications Corp., Taipei (TW)

( * ) Notice: Subject to any disclaimer, the term of this patent is extended or adjusted under 35 U.S.C. 154(b) by 172 days.

(21) Appl. No.: 10/949,644

(22) Filed: Sep. 24, 2004

(65) Prior Publication Data

US 2006/0068713 A1    Mar. 30, 2006

(51) Int. Cl.
  *H04B 1/38*    (2006.01)
(52) U.S. Cl. .................. 455/90.3; 455/67.12; 324/627
(58) Field of Classification Search ............. 455/757.1, 455/90.3, 347, 128, 67.11, 67.12, 67.13, 523, 455/115.1; 324/627, 750, 758, 95
  See application file for complete search history.

(56) References Cited

U.S. PATENT DOCUMENTS

| | | | | |
|---|---|---|---|---|
| 4,968,983 A * | 11/1990 | Maeda | ........................ | 343/703 |
| 5,300,939 A * | 4/1994 | Maeda et al. | ................ | 343/703 |
| 6,255,830 B1 * | 7/2001 | Rollin et al. | ................. | 343/703 |
| 6,795,030 B1 * | 10/2001 | Leach | ........................... | 126/29 |
| 6,411,102 B1 * | 6/2002 | Gilliland et al. | ............. | 324/627 |
| 6,563,301 B1 * | 5/2003 | Gventer | .................... | 324/158.1 |
| 2001/0032639 A1 * | 10/2001 | Leach | ........................ | 343/703 |
| 2004/0183547 A1 * | 9/2004 | Kildal | .......................... | 342/174 |
| 2005/0134291 A1 * | 6/2005 | Kahng et al. | ................ | 324/627 |
| 2006/0055592 A1 * | 3/2006 | Leather et al. | ............... | 324/627 |

\* cited by examiner

*Primary Examiner*—Eliseo Ramos-Feliciano
*Assistant Examiner*—Dai Phuong
(74) *Attorney, Agent, or Firm*—Thomas, Kayden, Horstemeyer & Risley

(57) ABSTRACT

A mobile phone positioning apparatus provides a rotational movement and switching functionality among three planes (H, $E_1$ and $E_2$) as requested by a radiation test. The positioning apparatus includes a base, a support shaft, a platform and a testing plane switch apparatus. The testing plane switch apparatus is mounted on the platform. An inverse U frame is fixed on the platform. A testing frame, pivotally connected to the inverse U frame, is rotated by two pneumatic cylinders so as to switch between the H plane and either the $E_1$ or $E_2$ plane by 90 degrees. A testing plate, pivotally connected to the testing frame, is rotated by another pneumatic cylinder so as to switch between the $E_1$ and $E_2$ planes by 90 degrees.

14 Claims, 4 Drawing Sheets

MOBILE PHONE POSITIONING APPARATUS FOR RADIATION TESTING

BACKGROUND

1. Field of Invention

The present invention relates to a mobile phone positioning apparatus. More particularly, the present invention relates to a mobile phone positioning apparatus for radiation testing.

2. Description of Related Art

Mobile phones have become an important communication device accompanying everyone. Because the human body is exposed to high levels of electromagnetic radiation generated by the mobile phone, each type of mobile phone needs to comply with limits for safe cell phone radiation exposure.

The radiation test for a mobile phone is generally executed in a chamber during the development or certification period to verify whether the mobile phone meets limits for safe cell phone radiation exposure or not. In radiation test procedures, a mobile phone is essentially positioned along three different planes (H, $E_1$ and $E_2$). The conventional positioning apparatus for radiation testing has to switch among the three planes manually. Opening a gate of the radiation test chamber and adjusting the H, $E_1$ or $E_2$ plane manually is inconvenient and time-consuming.

SUMMARY

It is therefore an objective of the present invention to provide a mobile phone positioning apparatus for radiation testing.

In accordance with the foregoing and other objectives of the present invention, a mobile phone positioning apparatus provides a rotational movement and a switching function to adjust the three planes as requested by a radiation test. The positioning apparatus includes a base, a support shaft, a platform and a testing plane switch apparatus. The testing plane switch apparatus is mounted on the platform. An inverse U frame is fixed on the platform. A testing frame, pivotally connected to the inverse U frame, is rotated by two pneumatic cylinders so as to switch between the H plane and either the $E_1$ or $E_2$ plane by 90 degrees. A testing plate, pivotally connected with the testing frame, is rotated by another pneumatic cylinder so as to switch between the $E_1$ and $E_2$ planes by 90 degrees.

Thus, the mobile phone positioning apparatus can be easily controlled by a computer to automatically switch between the three planes. Time and labor consumed in radiation testing can be decreased. Moreover, pneumatic cylinders made of low reflection coefficient materials are applied so as not to influence RF signals in a test chamber.

It is to be understood that both the foregoing general description and the following detailed description are by examples and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
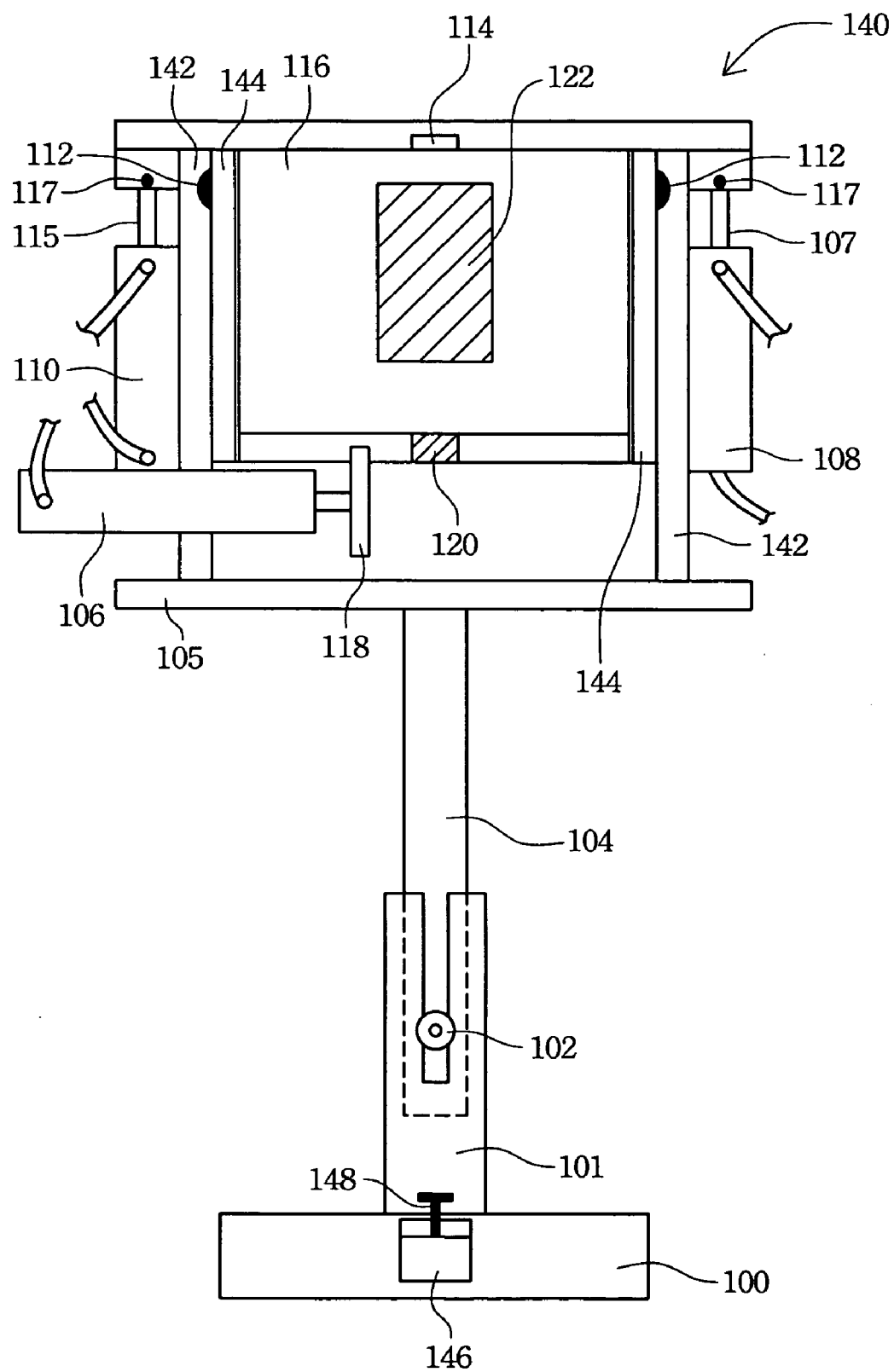
FIG. 1 illustrates a perspective view of a mobile phone positioning apparatus for radiation testing according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

In order to save labor and time consumed by radiation testing, the present invention provides a labor-saving mobile phone positioning apparatus to switch among three planes (H, $E_1$ and $E_2$). Moreover, a cylinder made of low reflection coefficient materials is applied to this positioning apparatus so as not to influence RF signals.

FIG. 1 illustrates a perspective view of a mobile phone positioning apparatus for radiation testing according to one preferred embodiment of this invention. The major function of this mobile phone positioning apparatus is to provide rotational movement and switching of the three planes (H, $E_1$ and $E_2$) for radiation testing. The mobile phone positioning apparatus includes a base 100, a support shaft 101, a platform 105 and a testing plane switch apparatus 140. The base 100 contains a motor 146 inside. The support shaft 101 is mounted on a rotary shaft 148 of the motor 146, thus enabling the motor 146 to drive the support shaft 101 so as to provide the rotational movement for the radiation test. The support shaft 101, which is hollow, holds another support shaft 104 by a knob 148. The support shaft 104 can be manually adjusted (when the knob 148 is released) to provide the platform 105 a desired height. The testing plane switch apparatus 140 is mounted on the platform 105. Fundamental parts of the testing plane switch apparatus 140 are an inverse U-shaped frame 142, a testing frame 144 and a testing plate 116. The inverse U-shaped frame 142 is fixed on the platform 105. The testing frame 144 is pivotally connected to the inverse U-shaped frame 142 by a joint 112. Two pneumatic cylinders 108 and 110, which are attached to two sides of the inverse U-shaped frame 142, drive the testing frame 144 (by pushing rods 107 and 115) to perform a 90-degree rotation movement back and forth. The testing plate 116 is pivotally connected to a top end of the testing frame 144 by a joint 114. A pneumatic cylinder 106, which is mounted on the platform 105, can drive the testing plate 116 to perform a rotational movement. In radiation testing procedures, the testing plate 116 is used to secure a mobile phone. Other driving devices, such as an apparatus containing a motor, can replace the pneumatic cylinders. The mobile phone positioning apparatus (including the pneumatic cylinders) for radiation testing is preferably made of low reflection coefficient materials, such as transparent plastic or acrylic materials, so as not to influence RF signals in the test chamber. Due to the application of the pneumatic cylinder, a computer can be easily used to automatically control a radiation test for a mobile phone.

Figure 2A:
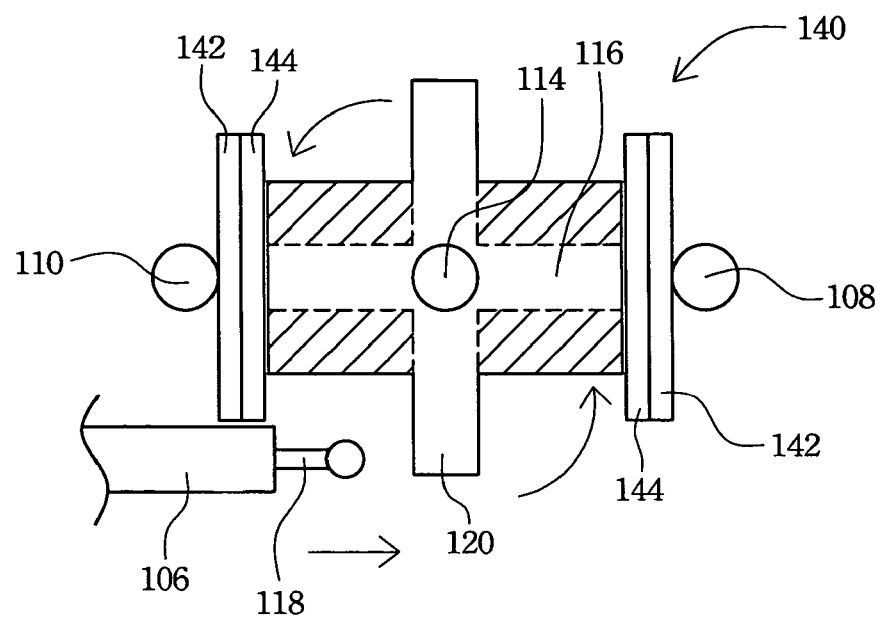
FIG. 2A illustrates a top view of a mobile phone positioning apparatus for radiation testing according to one preferred embodiment of this invention.

FIG. 2A illustrates a top view of a mobile phone positioning apparatus for radiation testing according to one preferred embodiment of this invention. FIG. 2A demonstrates how the pneumatic cylinder 106 drives the testing plate 116. The testing plate 116 has a rotation rod 120 perpendicular to itself. The pneumatic cylinder 106 has a pushing rod 118, which drives the rotation rod 120 or the testing plate 116 to move the testing plate 116 counter-clockwise. When the mobile phone positioning apparatus switches between the $E_1$ and $E_2$ planes, the testing plate 116 needs to be rotated counter-clockwise by 90 degrees.

Figure 2B:
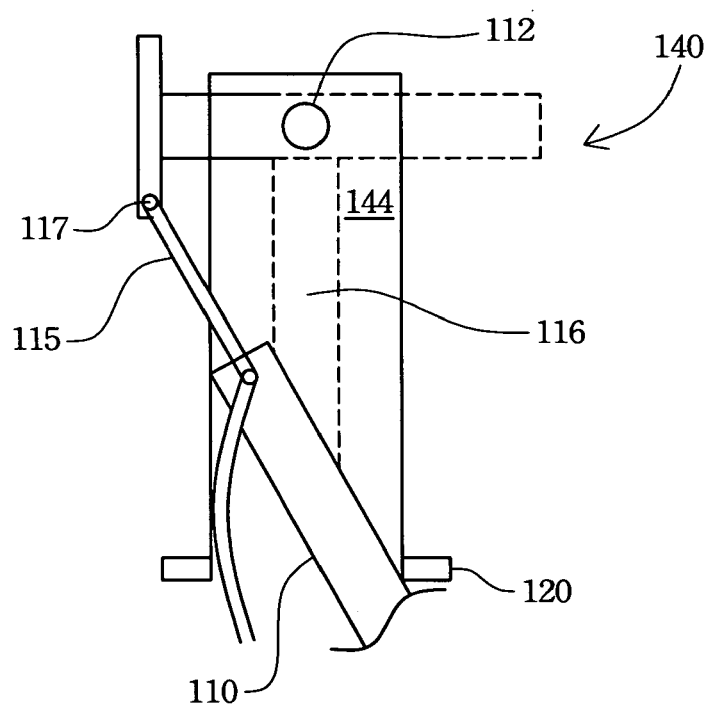
FIGS. 2B and 2C respectively illustrate side views of two different operation states of a testing plane switch apparatus according to one preferred embodiment of this invention.
Figure 2C:
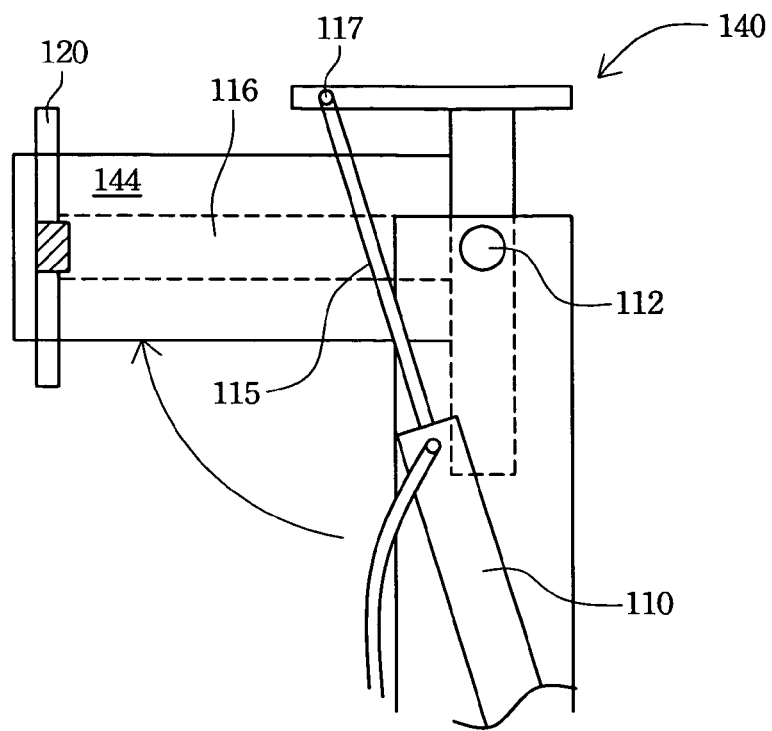

FIGS. 2B and 2C respectively illustrate side views of two different operation states of a testing plane switch apparatus according to one preferred embodiment of this invention. FIG. 2B illustrates a side view of FIG. 2A. When the pneumatic cylinder 106 (referring to FIG. 2A) drives the testing plate 116 to move counter-clockwise, the testing plate 116 needs to stay as illustrated in FIG. 2B. When the testing plane switch apparatus 140 desires to demonstrate the $E_1$ or $E_2$ plane, i.e., switching from the H plane to either the $E_1$ or $E_2$ plane, the testing frame 144 needs to rotate 90 degrees as illustrated in FIG. 2C. When the testing plane switch apparatus 140 desires to switch from the $E_1$ plane to the $E_2$ plane (or from the $E_2$ plane to the $E_1$ plane), the testing frame 144 needs to return to the state illustrated in FIG. 2B so as to rotate the testing plate 116 counter-clockwise (from the $E_1$ plane to the $E_2$ plane or from the $E_2$ plane to the $E_1$ plane); and then the testing frame 144 rotates 90 degrees again as illustrated in FIG. 2C to complete a switch cycle between the $E_1$ plane and the $E_2$ plane.

Figure 3:
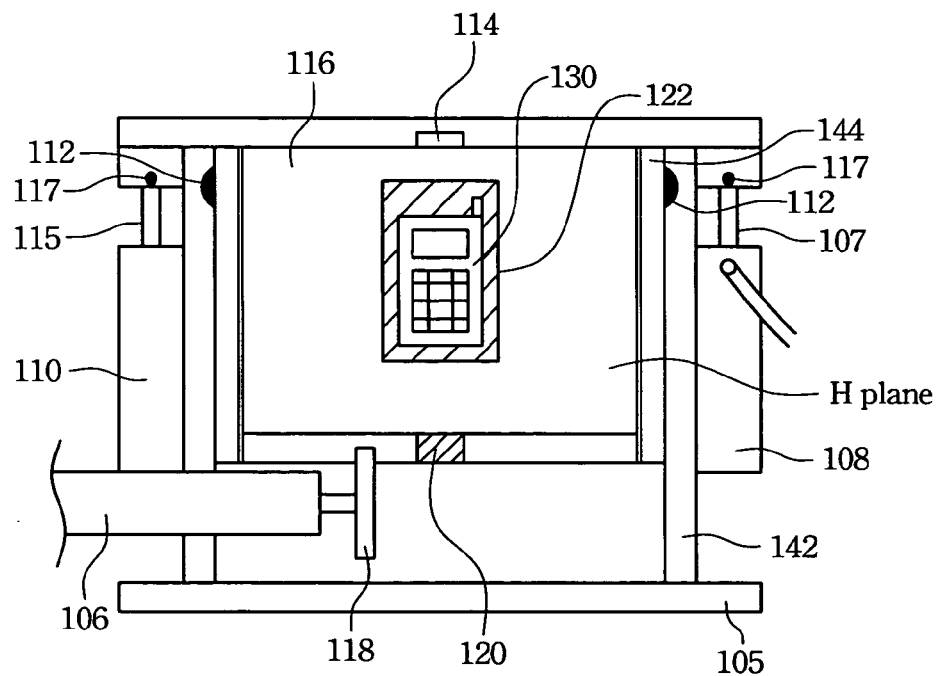
FIG. 3 illustrates a perspective view of the H plane demonstrated by the testing plane switch apparatus according to one preferred embodiment of this invention.

FIG. 3 illustrates a perspective view of the H plane demonstrated by the testing plane switch apparatus according to one preferred embodiment of this invention. When the radiation test is performed, a double-sided adhesive tape 122 (or an adhesive material layer) is used to secure a mobile phone 130 to the testing plate 116; and the mobile phone 130 driven (rotated) by the motor 146 (remaining at the H plane) moves.

Figure 4:
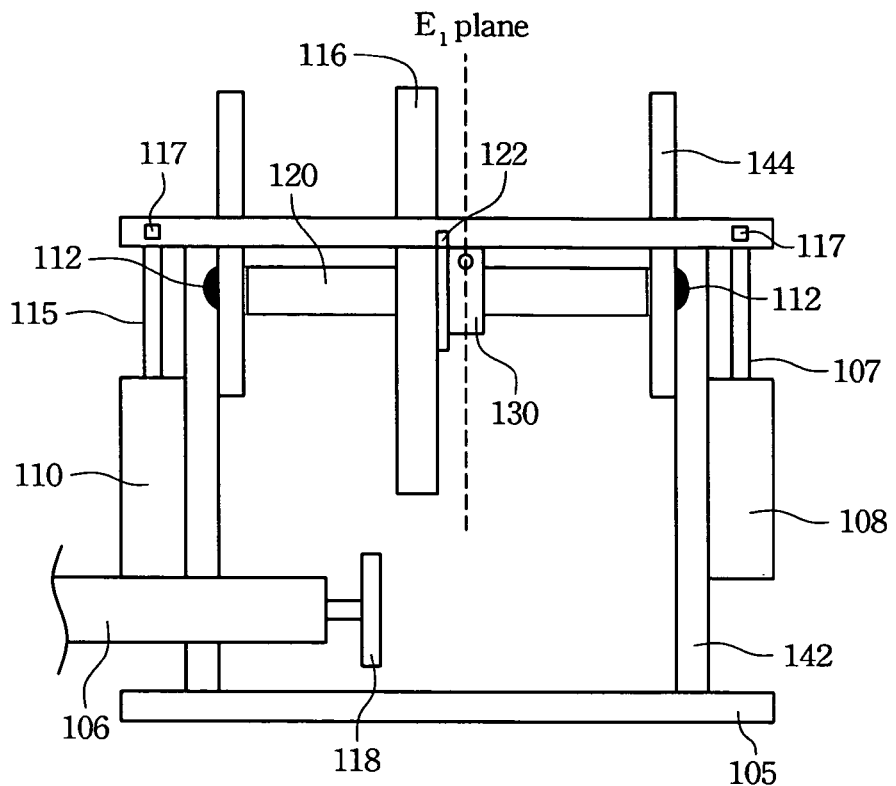
FIG. 4 illustrates a perspective view of the $E_1$ plane demonstrated by the testing plane switch apparatus according to one preferred embodiment of this invention.

FIG. 4 illustrates a perspective view of the $E_1$ plane demonstrated by the testing plane switch apparatus according to one preferred embodiment of this invention. The testing plate 116 illustrated in FIG. 3 (the H plane) driven (rotated) by the pneumatic cylinder 106 rotates 90 degrees and the testing frame 144 driven (rotated) by the pneumatic cylinders 108 and 110 rotates 90 degrees so that the testing plate 116 switches from the H plane (illustrated in FIG. 3) to the $E_1$ plane (illustrated in FIG. 4).

Figure 5:
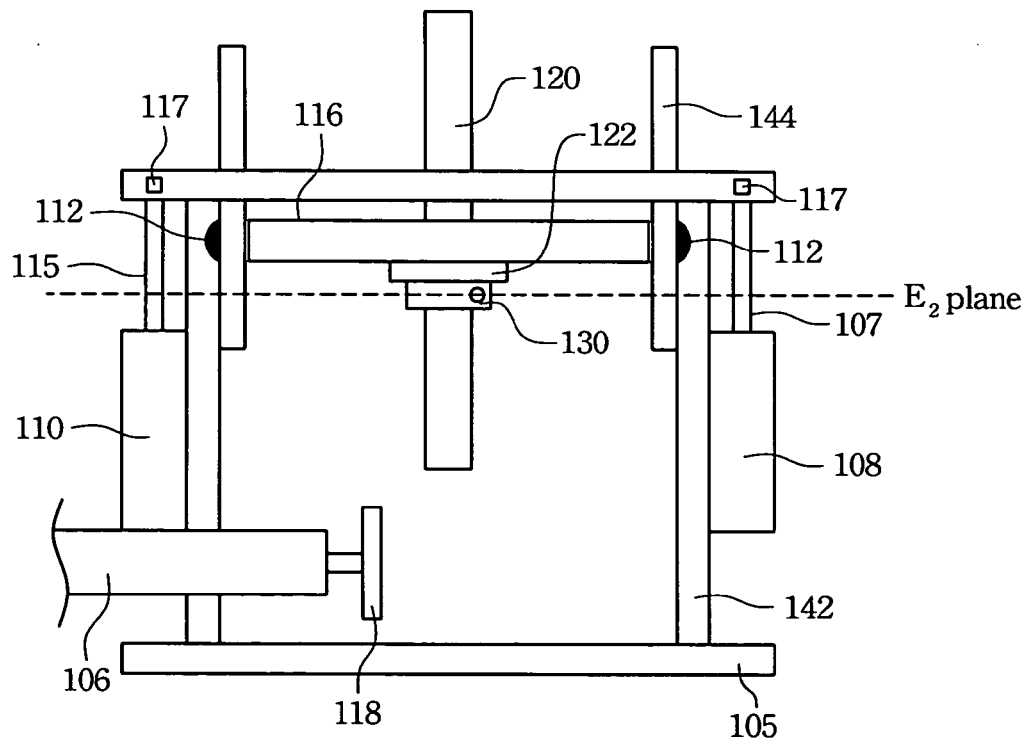
FIG. 5 illustrates a perspective view of the $E_2$ plane demonstrated by the testing plane switch apparatus according to one preferred embodiment of this invention.

FIG. 5 illustrates a perspective view of the $E_2$ plane demonstrated by the testing plane switch apparatus according to one preferred embodiment of this invention. The testing plate 116 illustrated in FIG. 3 (the H plane) driven (rotated) by the pneumatic cylinders 108 and 110 rotates 90 degrees so that the testing plate 116 switches from the H plane (illustrated in FIG. 3) to the $E_2$ plane (illustrated in FIG. 5).

According to the preferred embodiments of the present invention, the mobile phone positioning apparatus can be easily controlled by a computer to automatically switch three planes (H, $E_1$ and $E_2$). Time and labor consumed in radiation testing can be decreased. Moreover, pneumatic cylinders made of low reflection coefficient materials are applied so as not to influence RF signals in a test chamber.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile phone positioning apparatus for radiation testing, comprising:
   a base, having a motor;
   a support shaft, mounted on and rotated by said motor;
   a platform, fixed to said support shaft; and
   a testing plane switch apparatus, mounted on said platform, said testing plane switch apparatus comprising:
      an inverse U-shaped frame, fixed on said platform;
      two first driving apparatuses, mounted on said inverse U-shaped frame;
      a testing frame, pivotally connected to said inverse U-shaped frame by a first joint, said testing frame connected to and rotated by said first driving apparatuses to switch between an H plane and either an $E_1$ or $E_2$ plane by 90 degrees;
      a second driving apparatus, mounted on said platform; and
      a testing plate, pivotally connected to a top end of said testing frame by a second joint, said testing plate connected to and rotated by said second driving apparatus, wherein said testing plate, securing a mobile phone, is rotated by said second driving apparatus to switch between the $E_1$ and $E_2$ planes by 90 degrees.

2. The mobile phone positioning apparatus of claim 1, wherein said first driving apparatuses have a first pushing rod.

3. The mobile phone positioning apparatus of claim 1, wherein said second driving apparatus has a second pushing rod.

4. The mobile phone positioning apparatus of claim 1, wherein said first driving apparatuses are pneumatic cylinders made of acrylic materials.

5. The mobile phone positioning apparatus of claim 1, wherein said first driving apparatuses are pneumatic cylinders made of low reflection coefficient materials.

6. The mobile phone positioning apparatus of claim 1, wherein said second driving apparatus is a pneumatic cylinder made of acrylic materials.

7. The mobile phone positioning apparatus of claim 1, wherein said second driving apparatus is a pneumatic cylinder made of low reflection coefficient materials.

8. A testing plane switch apparatus for radiation testing, comprising:
   an inverse U-shaped frame, fixed on a platform;
   two first driving apparatuses, mounted on said inverse U-shaped frame;
   a testing frame, pivotally connected to said inverse U-shaped frame by a first joint, said testing frame connected to and rotated by said first driving apparatuses to switch between an H plane and either an $E_1$ or $E_2$ plane by 90 degrees;
   a second driving apparatus, mounted on said platform; and
   a testing plate, pivotally connected to a top end of said testing frame by a second joint, said testing plate connected to and rotated by said second driving apparatus, wherein said testing plate, securing a mobile phone, is rotated by said second driving apparatus to switch between the $E_1$ and $E_2$ planes by 90 degrees.

9. The testing plane switch apparatus of claim 8, wherein said first driving apparatuses have a first pushing rod.

10. The testing plane switch apparatus of claim 8, wherein said second driving apparatus has a second pushing rod.

11. The testing plane switch apparatus of claim 8, wherein said first driving apparatuses are pneumatic cylinders made of acrylic materials.

12. The testing plane switch apparatus of claim 8, wherein said first driving apparatuses are pneumatic cylinders made of low reflection coefficient materials.

13. The testing plane switch apparatus of claim 8, wherein said second driving apparatus is a pneumatic cylinder made of acrylic materials.

14. The testing plane switch apparatus of claim 8, wherein said second driving apparatus is a pneumatic cylinder made of low reflection coefficient materials.

* * * * *